(12) United States Patent
Omata

(10) Patent No.: US 8,970,882 B2
(45) Date of Patent: Mar. 3, 2015

(54) IMAGE PROCESSING APPARATUS WHICH UPDATES THE PRINT JOBS RETRIEVED FROM A SERVER AND DISPLAYED ON THE IMAGE PROCESSING APPARATUS IN RESPONSE TO JOB LIST DISPLAY CHANGING OPERATIONS PRIOR TO PRINTING

(75) Inventor: Jun Omata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/523,802

(22) Filed: Jun. 14, 2012

(65) Prior Publication Data

US 2012/0327462 A1 Dec. 27, 2012

(30) Foreign Application Priority Data

Jun. 27, 2011 (JP) ................ 2011-142309

(51) Int. Cl.
*G06F 3/12* (2006.01)
*G06K 15/00* (2006.01)
*G06K 15/02* (2006.01)

(52) U.S. Cl.
CPC ............ *G06F 3/1222* (2013.01); *G06K 15/005* (2013.01); *G06K 15/1817* (2013.01); *G06F 3/1238* (2013.01); *G06F 3/1267* (2013.01); *G06F 3/1288* (2013.01)

USPC .......................... 358/1.15; 358/1.16

(58) Field of Classification Search
CPC ... G06F 3/1222; G06F 3/1238; G06F 3/1267; G06F 3/1288; G06K 15/1817; G06K 15/005
USPC ...................... 358/1.15, 1.13, 1.14
See application file for complete search history.

(56) References Cited

U.S. PATENT DOCUMENTS

| 6,791,703 B1 * | 9/2004 | Maeda et al. ............... 358/1.15 |
| 2002/0083114 A1 * | 6/2002 | Mazzagatte et al. .......... 709/100 |
| 2007/0268531 A1 * | 11/2007 | Fujino et al. .................. 358/500 |
| 2009/0009780 A1 * | 1/2009 | Hayashi et al. ............... 358/1.9 |
| 2009/0310178 A1 * | 12/2009 | Tomita et al. ................ 358/1.15 |
| 2012/0081741 A1 * | 4/2012 | Iida ............................... 358/1.15 |
| 2012/0154848 A1 * | 6/2012 | Fukudome ................... 358/1.14 |
| 2012/0300240 A1 * | 11/2012 | Morita ......................... 358/1.13 |

FOREIGN PATENT DOCUMENTS

| JP | 2010-271824 | * 12/2010 | ............... H04N 1/00 |
| JP | 2010-271824 A | 12/2010 | |

* cited by examiner

*Primary Examiner* — Fred Guillermety
*Assistant Examiner* — Walter Yehl
(74) *Attorney, Agent, or Firm* — Fitzpatrick, Cella, Harper & Scinto

(57) ABSTRACT

Instead of receiving all pieces of job information accumulated in a server, some pieces of job information are acquired in addition to a total number of pieces of job information, and pieces of job information which can be displayed on one screen, and the latest information is acquired from the server as a scroll operation is performed.

10 Claims, 10 Drawing Sheets

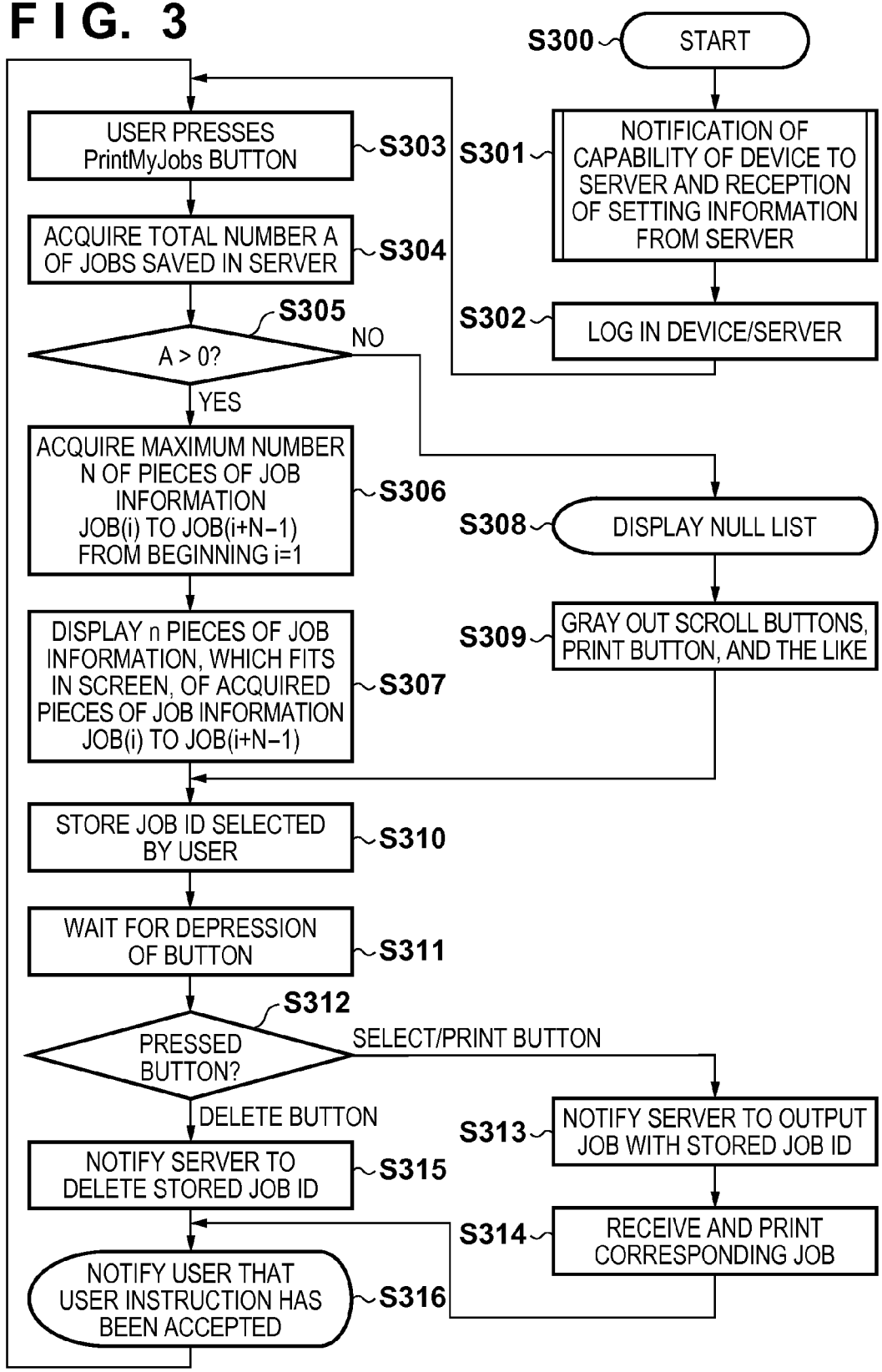

| ✓ | JOB NAME | NUMBER OF SHEETS | NUMBER OF COPIES | AMOUNT | TYPE |
|---|---|---|---|---|---|
| | JOB 1 | 1 | 1 | 10 | CL |
| | JOB 2 | 1 | 2 | 4 | BW |
| | JOB 3 | 1 | 5 | 50 | CL |

MY JOB PRINT — UPDATE

ERASE | DETAILED INFORMATION ▶ | ▼ 1234567 ▼

ERASE SETTING | PRINT ALL | START PRINT

NUMBER OF PAGES 1/3

| ✓ | JOB NAME | NUMBER OF SHEETS | NUMBER OF COPIES | AMOUNT | TYPE |
|---|---|---|---|---|---|
| ✓ | JOB 1 | 1 | 1 | 10 | CL |
| ✓ | JOB 2 | 1 | 2 | 4 | BW |
| ✓ | JOB 3 | 1 | 5 | 50 | CL |

MY JOB PRINT — UPDATE

ERASE | DETAILED INFORMATION ▶ | ▼ 1234567 ▼

ERASE SETTING | PRINT ALL | START PRINT

NUMBER OF PAGES 1/3

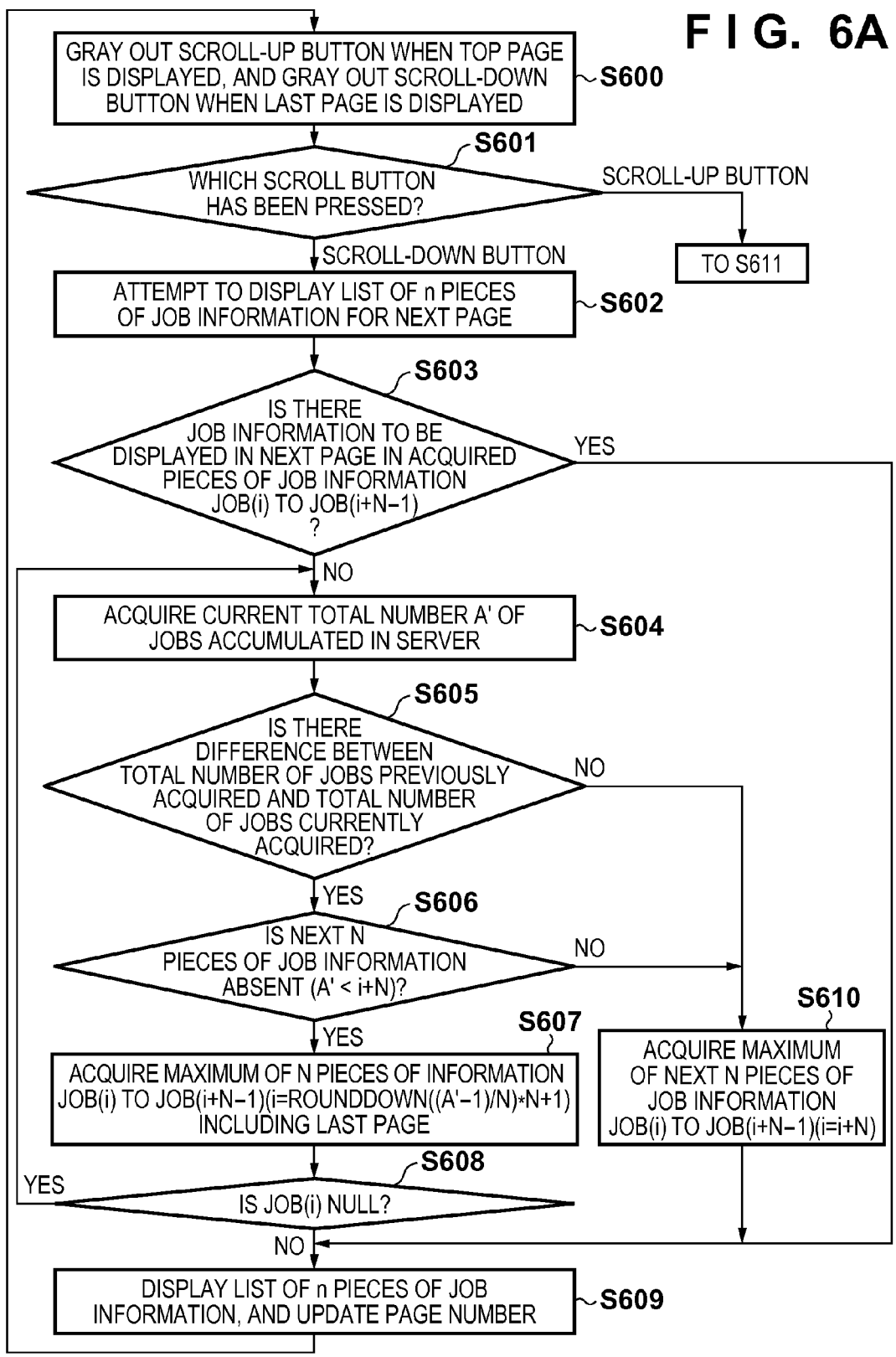

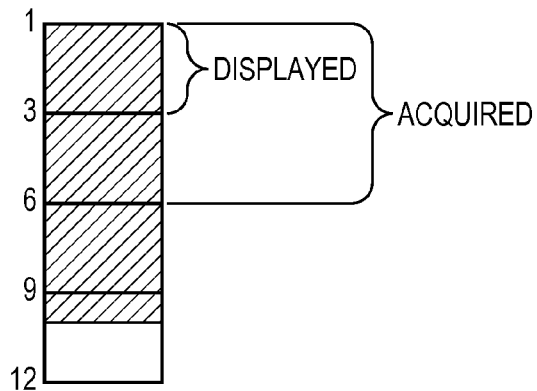
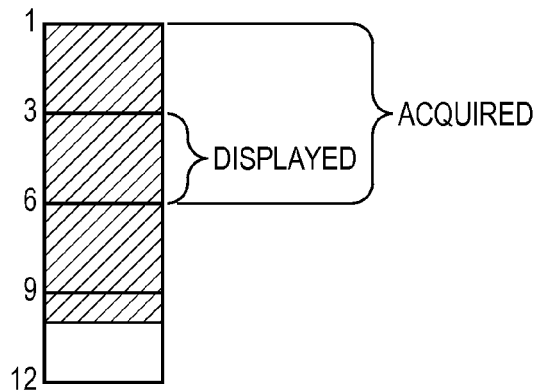
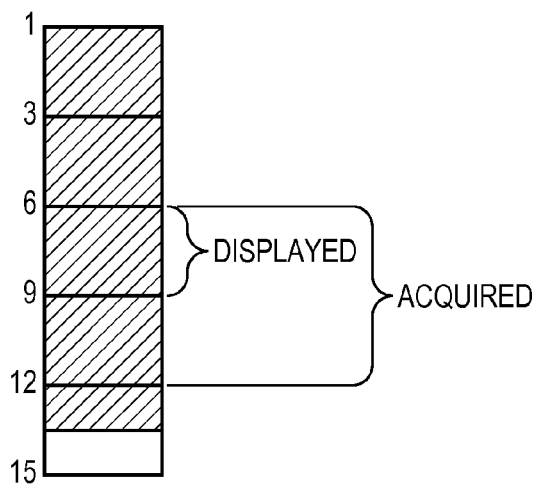
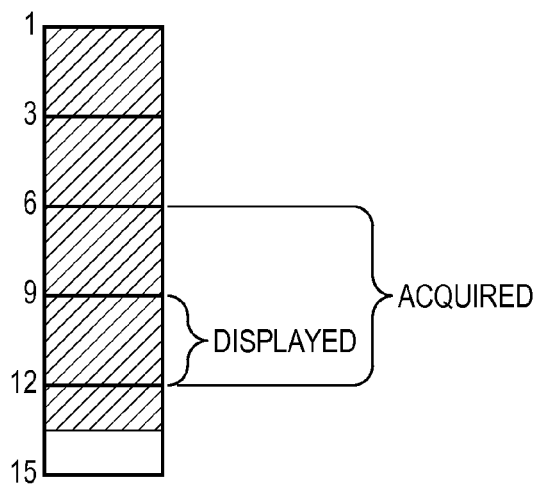
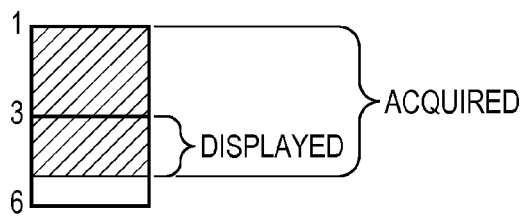

IMAGE PROCESSING APPARATUS WHICH UPDATES THE PRINT JOBS RETRIEVED FROM A SERVER AND DISPLAYED ON THE IMAGE PROCESSING APPARATUS IN RESPONSE TO JOB LIST DISPLAY CHANGING OPERATIONS PRIOR TO PRINTING

BACKGROUND OF THE INVENTION

1. Field of the Invention

The present invention relates to an image processing apparatus which acquires job information accumulated in an application server to display jobs, an image forming system, and an image output method.

2. Description of the Related Art

In recent years, to print using a device (which may be referred to as an image output apparatus) such as a multi function peripheral (MFP), the user stores (spools) a print job in an application server instead of directly inputting the job from a host PC to the device in terms of security. After the user performs a predetermined operation to be authenticated in the device from which he/she wants to output the job, the device receives job information from the application server. The device creates a list of jobs based on the received job information, and displays it on a user interface (to be referred to as a UI hereinafter). Then, the user selects, from the list displayed on the UI, a job to be printed, and then outputs it.

Japanese Patent Laid-Open No. 2010-271824, for example, discloses a technique in which after authenticating a user, a device accepts jobs of the authenticated user from a server, and displays them. Furthermore, to acquire jobs, the device receives all the pieces of job information for the authenticated user, and then displays the jobs on a UI.

In the technique described in Japanese Patent Laid-Open No. 2010-271824, however, it is necessary to acquire information for all jobs accumulated in the server. Since an advanced device has a sufficient memory capacity, a shortage in memory or the like rarely occurs. Since a low-cost device does not have sufficient memory capacity, a shortage in the memory capacity may occur when information for all jobs is acquired.

If the device acquires all jobs prior to printing, it cannot display all the jobs on one screen, and thus a scroll operation may be required. As the number of jobs increases, the number of scroll operations also increases, thereby taking a time to select a job. This increases the probability that a job saved in the server is deleted or a new job is added while the user selects a job to be printed in the device, thereby causing a difference between job information displayed on the device and that saved in the server frequently.

SUMMARY OF THE INVENTION

The present invention has been made in consideration of the above problems, and provides an image processing apparatus which selects a job in server storage printing even using a device which has only a small memory capacity or a device which has a UI requiring a scroll operation, an image forming system, and an image output method.

According to one aspect of the present invention, the present invention comprises the following arrangement. That is, an image processing apparatus which receives a print job from a server and executes the print job, comprises: a request unit which requests, from the server, job information of a first predetermined number of print jobs of print jobs that are executable by the image processing apparatus and are saved in the server; a saving unit which receives and saves the job information that has been transmitted from the server in response to the job information request; a display unit which displays, as a job list for selecting a print job, a second predetermined number of pieces of job information of the job information saved in the saving unit; and an execution unit which requests, from the server, a print job selected from the job list, and receives and executes the print job that has been transmitted in response to the request, wherein in response to an instruction to display job information of print jobs, which are not displayed in the job list, of the print jobs executable by the image processing apparatus, the image processing apparatus displays, if the saving unit saves job information to be displayed, the saved job information, and causes, if the saving unit does not save job information to be displayed, the request unit to request, from the server, job information of the first predetermined number of next print jobs, causes the saving unit to save the job information, and causes the display unit to display the job information as a job list.

As described above, according to the present invention, only some of jobs stored in a server are acquired and displayed. Even if, therefore, a large number of jobs are stored in the server, an image output apparatus does not require a large memory capacity unlike the conventional technique. Furthermore, it is possible to acquire the latest job information in response to a user scroll operation, thereby improving the convenience of the user.

Further features of the present invention will become apparent from the following description of exemplary embodiments with reference to the attached drawings.

BRIEF DESCRIPTION OF THE DRAWINGS

FIG. 3 is a flowchart illustrating a basic operation for implementing the present invention;

FIG. 5A is a view showing an example of an operation screen for job selection;

FIG. 5B is a view showing an example of an operation screen for job selection;

FIG. 6A is a flowchart illustrating processing when a scroll operation is executed for implementing the present invention;

FIGS. 7A, 7B, 7C, 7D, and 7E are schematic views when scroll-down operations are performed.

DESCRIPTION OF THE EMBODIMENTS

Best modes for carrying out the present invention will be described below with reference to the accompanying drawings.

First Embodiment

Figure 2:
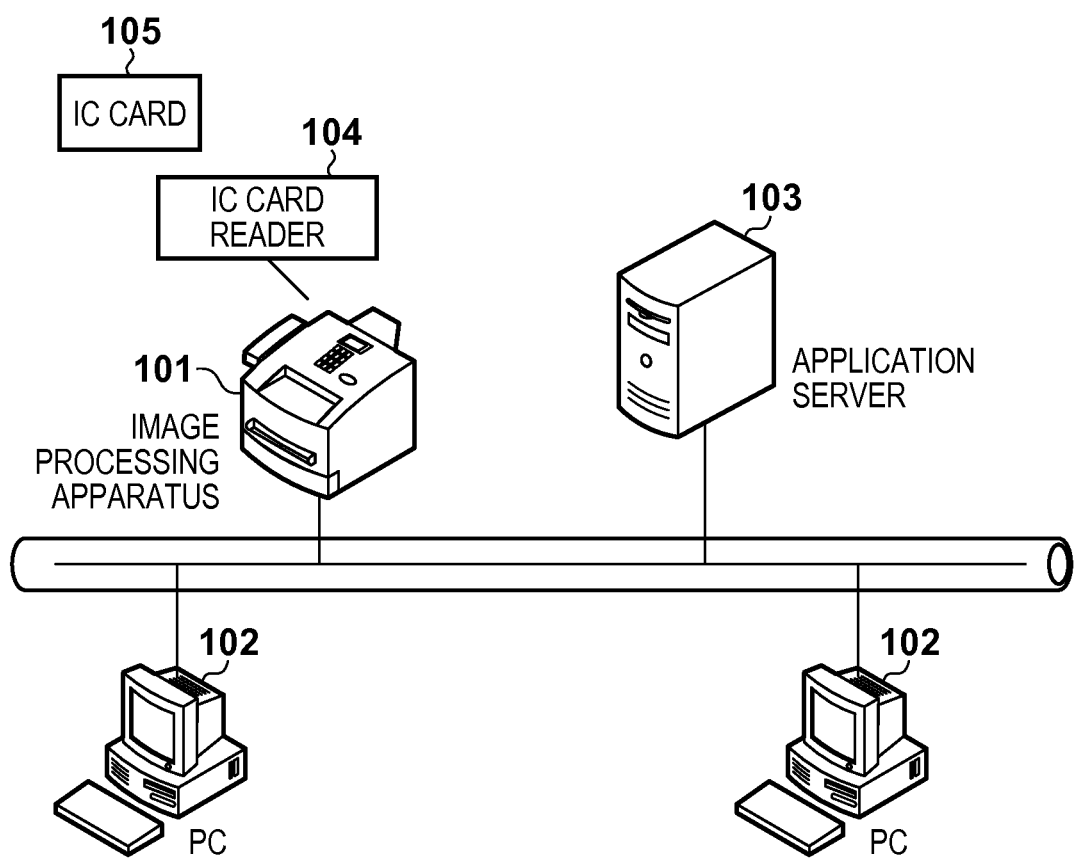
FIG. 2 is a view showing the configuration of a system in which the image processing apparatus according to the embodiment of the present invention is used.

FIG. 2 is a schematic view showing an image forming system (or image processing system) in which an image processing apparatus according to an embodiment of the present invention is used. In this system, a digital multi function peripheral (MFP) 101, a plurality of PC terminals 102, and an application server 103 are communicably connected with each other via a network. The MFP 101 supports a service provided by the application server 103, and notifies the application server 103 of the capability of the MFP 101 for the service. The application server 103 transmits, at regular intervals, setting information based on the received capability of the MFP, according to which the MFP should operate. The MFP 101 receives the setting information transmitted by the application server 103 at regular intervals. The MFP 101 operates according to the setting information by holding the received information in a RAM 212 or HDD 214, and referring to it.

Note that the application server 103 has the configuration of a typical general-purpose computer. That is, a processor executes a program loaded in a main memory to process data. Examples of the program to be executed are an operating system and an application program. The processor also executes the program of a procedure shown in FIG. 4B (to be described later) or the like. Furthermore, the processor executes a process which is always active for providing a service for a client, thereby responding to, for example, a query about the number of saved jobs from a client (including an MFP in this embodiment). The application server 103 also includes necessary hardware resources such as a network interface, as a matter of course.

<Configuration of MFP>

Figure 1:
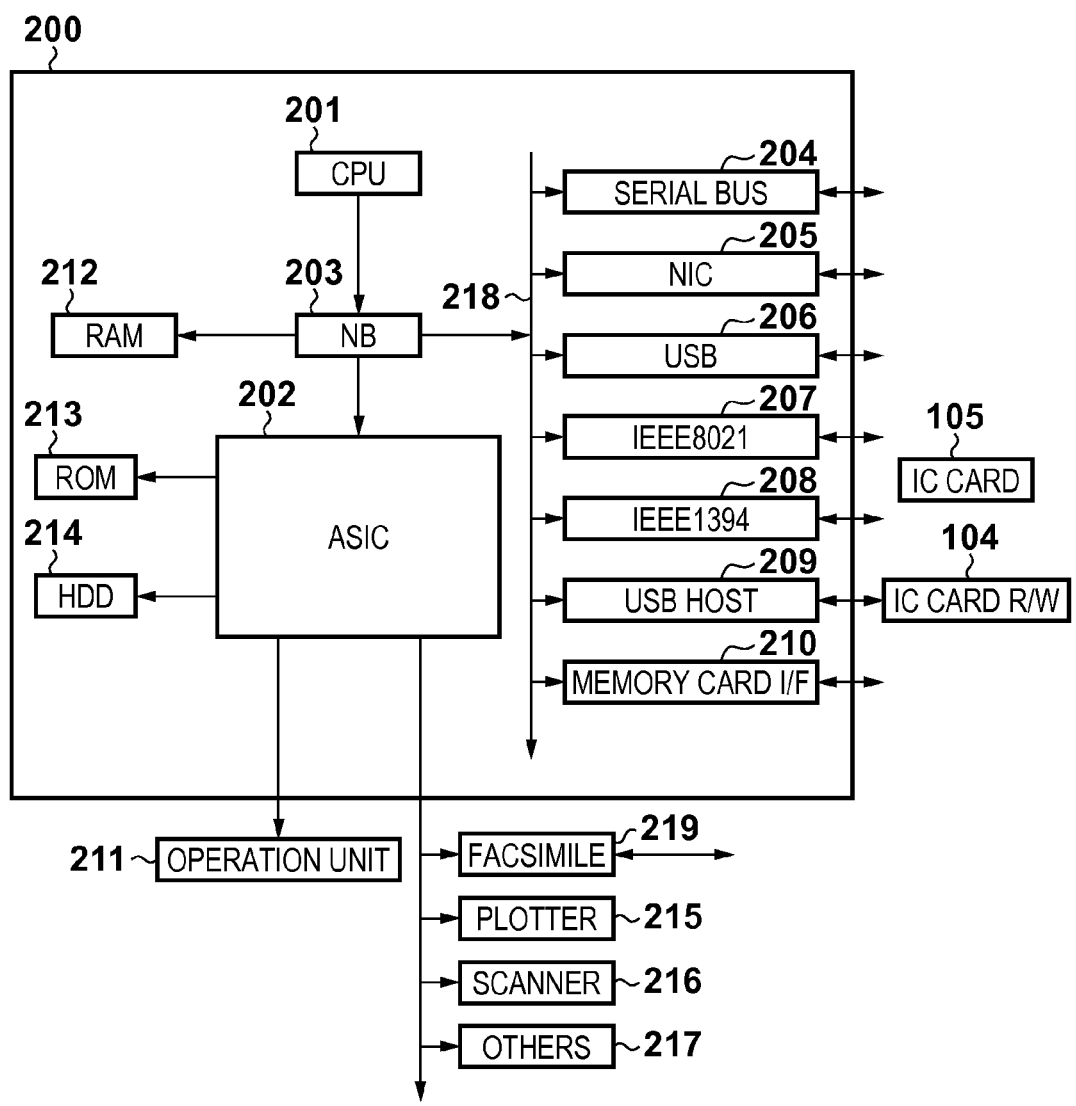
FIG. 1 is a block diagram showing the hardware configuration of an image processing apparatus according to an embodiment of the present invention.

FIG. 1 is a block diagram showing the hardware configuration of an MFP (an image forming apparatus, image output apparatus, or image processing apparatus) according to the embodiment of the present invention. Referring to FIG. 1, the MFP 101 includes a controller 200 for controlling the MFP as a whole, and an operation unit 211 with an operation panel for setting processes and operations of the MFP. The MFP 101 also includes a facsimile control unit 219 for performing facsimile control, a plotter 215 for image processing, a scanner 216 for reading a document, and other hardware resources 217.

The controller 200 includes a CPU 201 for controlling the MFP as a whole, and an ASIC 202 for a controller with an operation unit I/F, CPU I/F, PCI I/F, memory controller, and the like. The controller 200 also includes the HDD 214 for accumulating image data, a serial bus 204, a network interface card 205 with a function of connecting to a network, a USB device 206, an IEEE wireless LAN I/F 207, and an IEEE I/F 208 for connecting a peripheral. In addition to them, the controller 200 includes a USB host 209 for connecting an IC card reader/writer (R/W) 104 or the like, and a North Bridge 203 connected to a memory card I/F 210 via a PCI bus 218. Furthermore, the controller 200 includes the RAM 212 and a ROM 213. The facsimile control unit 219, the plotter 215, the scanner 216, and other hardware resources 217 are connected with the ASIC 202 via the PCI bus 218.

The CPU 201 is connected with the IC card reader/writer 104 by a USB cable via the NB 203, PCI bus 218, and USB host 209, and controls the IC card reader/writer 104 by transmitting commands to it. Access to an IC card 105 is attained when the IC card reader/writer 104 communicates with the IC card 105.

<Download and Execution of Print Job>

FIG. 3 is a flowchart illustrating a basic operation for receiving a print job from the application server 103 and printing it, which is executed by the CPU 201 of the image processing apparatus as the MFP for implementing the present invention. The user logs into the image processing apparatus, and performs a predetermined operation for downloading and executing a job. This is used as a trigger to start a procedure shown in FIG. 3. In step S301, initial settings (to be described in detail later) are made. The application server 103 is notified of the capability of the image processing apparatus saved in the RAM 212 or ROM 213 via the network. In this embodiment, the capability of the image processing apparatus of which the application server 103 is notified includes, for example, a function (job selection function) of displaying a list of jobs to prompt the user to select a specific job. This function can be implemented by including, as element functions, a display device for displaying a list of jobs and an input device for selecting a specific job from the displayed list, and further including software for providing a user interface. The job selection function, therefore, may be represented by the presence/absence of the above three functions. The application server 103 transmits, to the device, setting information based on the received capability of the device. The image processing apparatus holds the received setting information in the RAM 212 or HDD 214, and operates according to the setting information. The setting information indicates settings for the function of the device. For example, for the job selection function, the setting information indicates settings of using this function. Note that the processing in step S301 will be described in detail with reference to FIGS. 4A and 4B. FIG. 3 shows a processing example by assuming that the MFP has the job selection function.

In step S302, the controller 200 of the image processing apparatus requests authentication of the application server 103 using information obtained by the login operation, for example, information acquired from the IC card reader/writer 104, and the application server 103 performs authentication. The image processing apparatus may perform authentication alone. Note that as an authentication method, an ID and password can be input instead of using the card reader. Although a login operation is necessary for operating the MFP 101, it need not be done in synchronism with the operation of the MFP unlike the processing in FIG. 3. If, for example, the user has already logged in, the process starts in step S303.

In step S303, a button for printing a print job which is stored in the application server 103 by the user and is executable by the user, for example, a PrintMyJobs button is pressed, and then the process advances to step S304.

In step S304, the controller 200 of the MFP 101 requests to transmit a total number A of jobs accumulated in the application server 103. The controller 200 saves, in the RAM 212, the total number A of jobs which have been received from the application server 103 in response to the request.

In step S305, the received total number A of jobs is determined. If the total number A of jobs is 1 or larger, the process advances to step S306. Alternatively, if the number A of jobs is 0, the process advances to step S308.

In step S306, the controller 200 acquires job information accumulated in the application server 103. The controller 200 requests the application server 103 to transmit a maximum number N of pieces of job information JOB(i) to JOB(i+N−1) from the beginning (i=1), where the number N has been set in the image processing apparatus. The number N corresponds to a first predetermined number. That is, the MFP 101 requests the application server 103 to transmit job information of N jobs from job information of the ith print job. The MFP 101 saves the received job information JOB(i) to JOB (i+N−1) of the N jobs in the RAM 212. If the number of remaining jobs is less than N, all the remaining jobs are to be transmitted. Note that the order of the jobs may be set by the MFP 101, or may have been determined in advance. It is possible to determine the order based on various attributes such as a date/time when a print job is generated, a date/time when a job is saved in the application server 103, a name, a job ID, a size, and priority, or to designate the orders of the individual jobs.

In step S307, the controller 200 displays, on the operation unit 211, a list of n (n<N) pieces of job information, which can be displayed on the operation unit 211, of the acquired job information, and the process advances to step S310. The number n corresponds to a second predetermined number. At this time, it is possible to perform a scroll operation (to be described later) to display a portion which is not currently displayed. The user can select a desired print job from the list. If a scroll operation is performed, the displayed portion of the list is changed according to a scroll amount, and print jobs which should be included in the portion are displayed. At this time, if there is no job information of the print jobs to be displayed, the job information is acquired from the application server 103 to be displayed. That is, upon performing a scroll operation, the processing in step S307 is re-executed as long as there is job information of display targets, thereby displaying a job list. If, however, there is no job information of display targets, the processing in step S306 is re-executed to acquire job information. Note that this processing will be described in detail with reference to FIGS. 6A and 6B. Since it is determined in step S305 that the total number A of jobs is 0, a null list is displayed on the operation unit 211 in step S308.

Since the null list is displayed on the operation unit 211, scroll buttons and a print button are grayed out in step S309, and then the process advances to step S310.

In step S310, when the user selects a print job from the print job list displayed on the operation unit 211 in step S307, the job ID of the selected print job is saved in the RAM 212.

In step S311, it is detected that the user operates the operation unit 211 to press a print or delete button.

In step S312, it is determined whether the button operated by the user is the delete button or print button. If the user presses the print button, the process advances to step S313. If the user presses the delete button, the process advances to step S315.

In step S313, the application server 103 is notified of the job ID saved in the RAM 212 to request the device as a request source to output the print job.

In step S314, the MFP receives the print job which has been transmitted from the application server 103 in response to the request transmitted in step S313, and executes the print job to print, thereby advancing the process to step S316.

On the other hand, in step S315, the application server 103 is notified to delete the job ID saved in the RAM 212, and the process advances to step S316.

In step S316, by displaying the fact that the user instruction has been accepted on the operation unit 211, the user is notified of it. The process then returns to step S303.

<Capability Notification and Setting Processing>

Figure 4A:
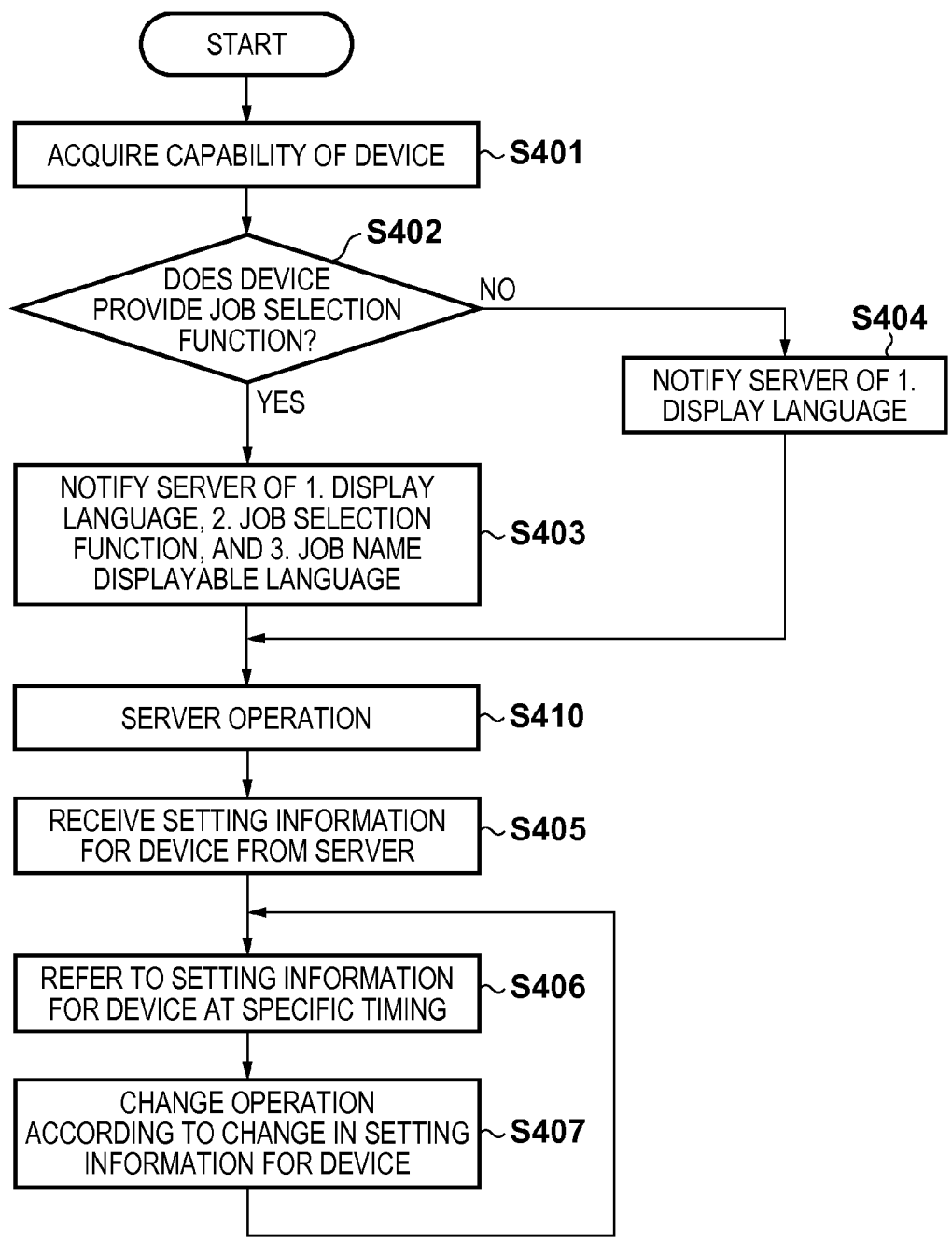
FIG. 4A is a flowchart illustrating a presetting operation for implementing the present invention.
Figure 4B:
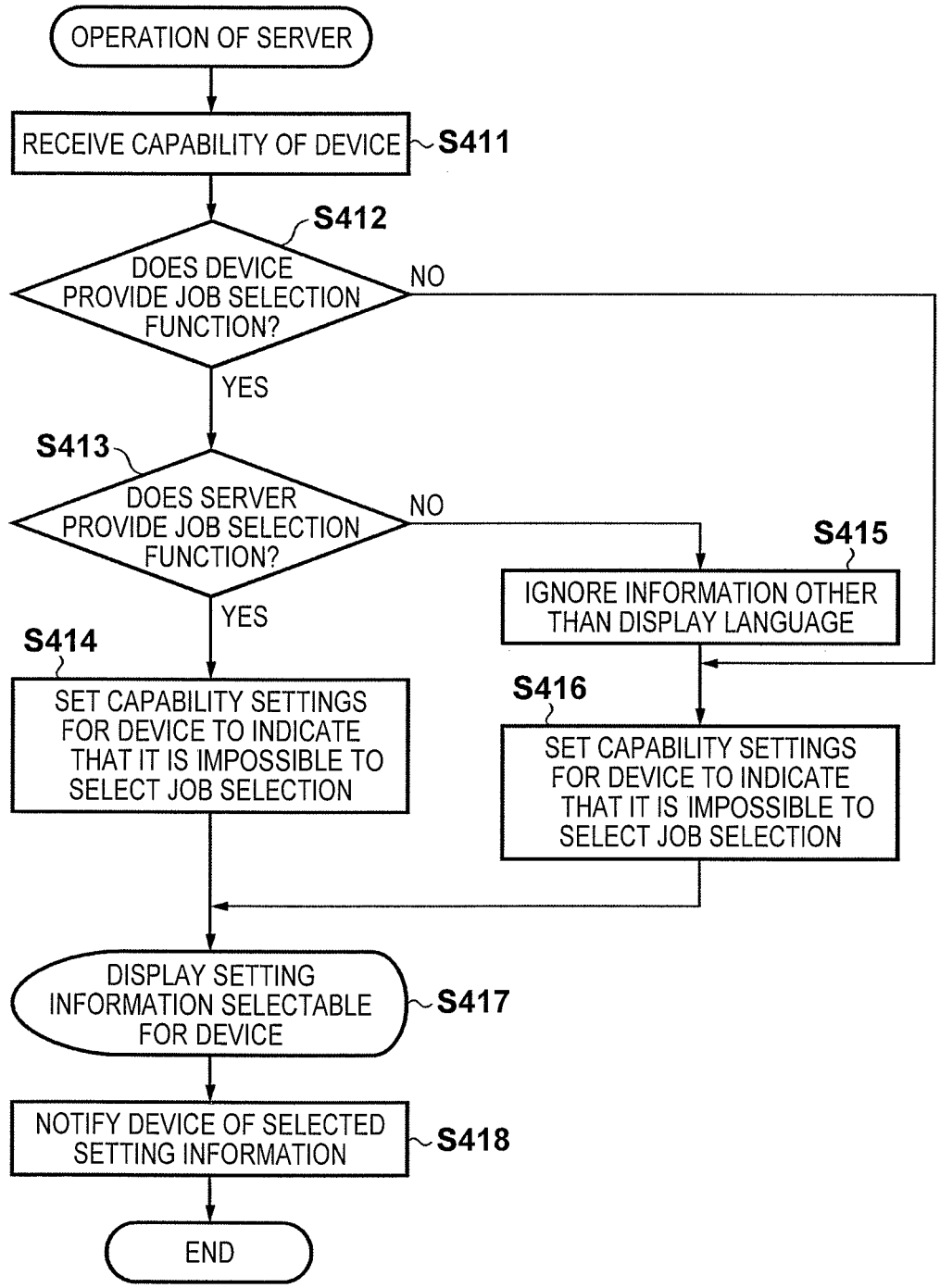
FIG. 4B is a flowchart illustrating a presetting operation for implementing the present invention.

FIGS. 4A and 4B are flowcharts illustrating details of the processing in step S301 by the MFP (to be referred to as an image processing apparatus hereinafter) 101 for implementing the present invention. FIG. 4A shows the operation of the CPU 201 of the image processing apparatus 101.

In step S401, the CPU 201 loads the information saved in the ROM 213 and indicating whether the image processing apparatus 101 has a print job selection function (job selection function). The job selection function is, for example, a function of displaying a list of a plurality of print jobs, and prompting the user to select a desired print job from the list. Information indicating the presence/absence of the job selection function is saved in advance in a predetermined memory location in the ROM 213 or the like.

In step S402, if the information loaded in step S401 indicates that the apparatus supports the job selection function, the process advances to step S403; otherwise, the process advances to step S404.

In step S403, the CPU 201 notifies the application server 103 of capability information which includes information indicating the display language of the image processing apparatus 101, that indicating the presence of the job selection function, and that indicating a job name displayable language. All the pieces of information are saved in the ROM 213.

In step S404, the CPU 201 notifies the application server 103 of capability information which includes information indicating the display language of the image processing apparatus 101 using the same communication means as that used in step S403. Note that the CPU 201 may simultaneously transmit information indicating the absence of the job selection function. Furthermore, since only contents to be transmitted are different in the processes in steps S403 and S404, the processes may be actually executed in one step.

Upon receiving the capability information transmitted in step S403 or S404, the application server 103 transmits setting information selected for the image processing apparatus 101 in step S410.

In step S405, the image processing apparatus 101 receives the setting information sent in step S410. The received information is saved in the RAM 212 or ROM 213. The setting information is transmitted at irregular intervals in step S410.

In step S406, the CPU 201 loads, that is, refers to the setting information saved in step S405 at a specific timing, for example, at a given interval or at a timing instructed by the user.

In step S407, the CPU 201 changes the operation of the image processing apparatus 101 based on the information loaded in step S406.

Processing in steps S411 to S418 of FIG. 4B is executed by the application server 103 which has received the notification in step S403 or S404 from the image processing apparatus 101. Note that the image processing apparatus 101 is referred to as a device in FIG. 4B.

In step S411, the application server 103 receives the capability information of the image processing apparatus transmitted in step S403. Note that although the process in FIG. 4B starts in step S411 for descriptive convenience, reception of the capability information is actually used as a trigger to start the processing in FIG. 4B.

In step S412, it is determined based on the received capability information whether the image processing apparatus 101 has the job selection function. If the apparatus has the function, the process advances to step S413; otherwise, the process advances to step S416.

In step S413, the application server 103 acquires its capability to determine whether it supports the job selection function. Information about the capability of the application server 103 is stored in, for example, a database associated with resources managed by the operating system. If the application server 103 has the job selection function, the process advances to step S414; otherwise, the process advances to step S415.

In step S414, the application server 103 sets capability settings for the image processing apparatus 101 to indicate that it is possible to select the job selection function, and saves the setting information, thereby advancing the process to step S417.

In step S415, the application server 103 ignores the information other than the display language of the capability information received from the image processing apparatus 101 in step S411. In step S416, the application server 103 sets capability settings for the image processing apparatus 101 to indicate that it is impossible to select the job selection function, and saves the setting information, thereby advancing the process to step S417. Note that since there is no actual processing in step S415, setting information may be created by ignoring the information other than the display language in step S416.

In step S417, the application server 103 displays, to the user, setting information selectable as settings for the image processing apparatus 101. Note that this display operation can be omitted.

In step S418, the application server 103 transmits the setting information set in it to the image processing apparatus 101.

FIGS. 5A and 5B are examples of a screen displayed on the operation unit 211 of the image processing apparatus 101. A screen 500 is a screen example displayed first in step S306. As a list of jobs, a job name, the number of print sheets, the number of copies, an amount to be charged, and a type (color/monochrome or the like) are displayed. The user can select a displayed job on this screen. A screen 501 is a screen example after the user selects corresponding jobs in step S310. The selected print jobs are checked.

<Display Processing of Job List>

Figure 6B:
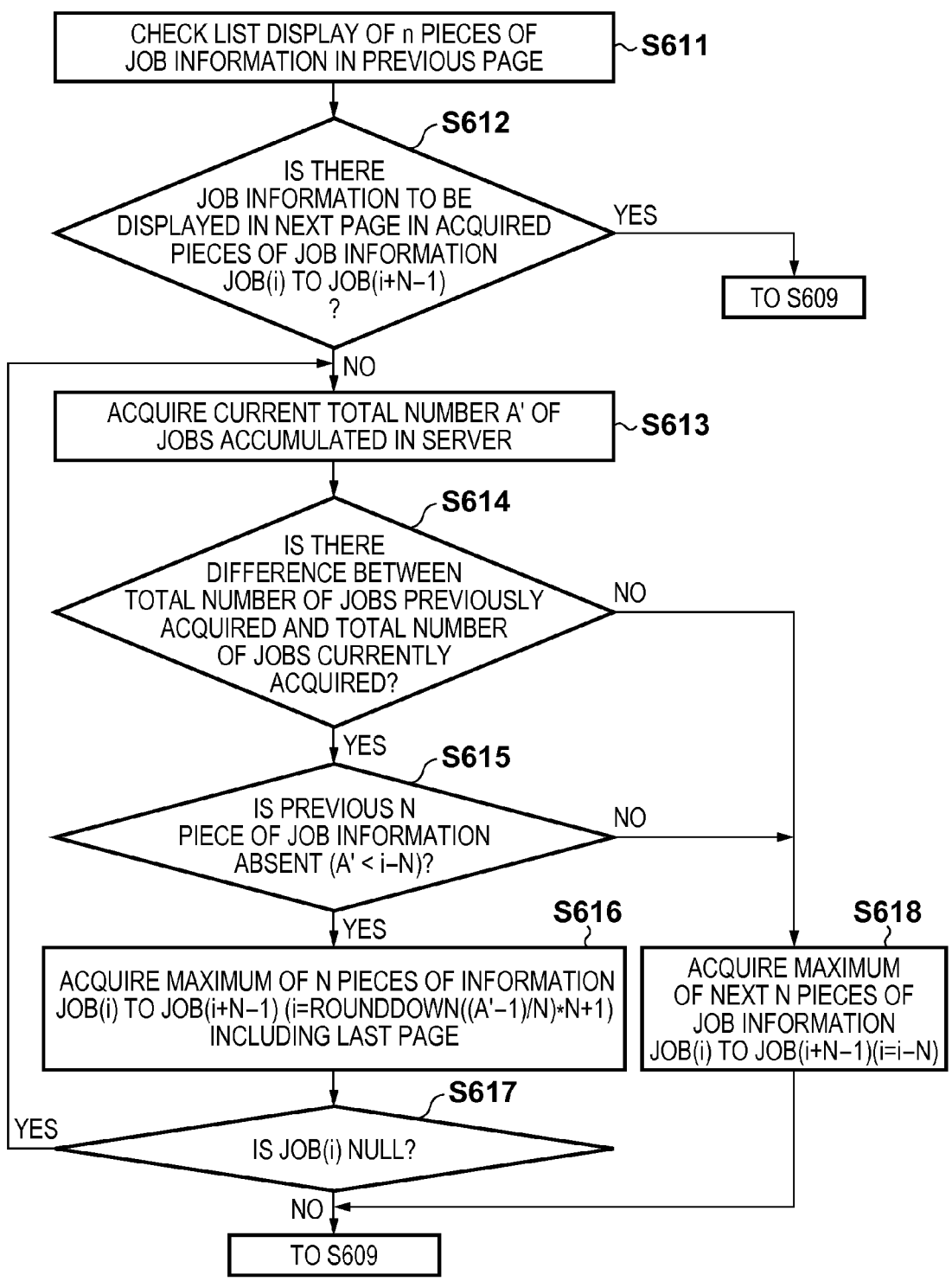
FIG. 6B is a flowchart illustrating processing when a scroll operation is performed for implementing the present invention.

FIGS. 6A and 6B are flowcharts illustrating the operation of the CPU 201 when a scroll operation is performed in step S307. When the screen 500 or 501 is displayed, a scroll-up button is grayed out in step S600 if the top page is displayed, and a scroll-down button is grayed out in step S600 if the last page is displayed. Note that the term "page" indicates part of the job list, which corresponds to the displayable region of the operation unit 211. A page including the beginning of the list is the top page, and a page including the end of the list is the last page.

In step S601, the CPU 201 accepts a user operation of pressing the scroll button. If the user presses the scroll-down button, the process advances to step S602. Alternatively, if the user presses the scroll-up button, the process branches to step S611. Note that when the user presses another button or the like, the process branches to corresponding processing. A description of the processing will be omitted in this embodiment.

In step S602, it is determined whether n pieces of job information for a next page to be displayed on the operation unit 211 are saved in the RAM 212.

If, as a result of the determination in step S602, n pieces of job information for a next page are saved, in step S603 the process branches to step S609. Alternatively, if n pieces of job information for a next page are not saved in the RAM, the process branches to step S604.

Prior to acquisition of the job information, in step S604, the CPU 201 requests, via the network, to transmit a current total number A' of jobs accumulated in the application server 103, and saves the responded current total number A' of jobs in the RAM 212. The current total number of jobs indicates the total number of print jobs which are printable by the image processing apparatus 101 and are saved in the application server 103 when the request transmitted in step S604 is received.

In step S605, the total number A of jobs previously acquired is compared with the latest total number A' of jobs acquired in step S604. If there is no difference between the total numbers of jobs, the process branches to step S610; otherwise, the process branches to step S606.

In step S606, it is determined whether the jobs, the total number A' of which has been acquired in step S604, include N pieces of job information JOB(i) to JOB(i+N−1) which are to be acquired from the application server 103 next. That is, it is determined whether A'<i+N holds. If the inequality holds, the N pieces of job information are not included, and thus the process branches to step S607. Alternatively, if the inequality does not hold, the N pieces of job information are included, and thus the process branches to step S610.

When the number A' of jobs acquired in step S604 decreases and there is no job information to be displayed next, the process advances to step S607. As job information to be displayed, a maximum of N pieces of job information (i) including a last page P=ROUNDUP(A'/n) are acquired from the application server 103, and saved in the RAM 212. An index i indicating the order of a job is obtained by i=ROUNDDOWN((A'−1)/N)*N+1. Note that ROUNDUP represents a function of rounding up the fractional portion and ROUNDDOWN represents a function of rounding down the fractional portion. That is, i represents the index of the first one of N jobs in which the A'th job is the last job. As an example which executes this procedure, assume that A=30, n=5, N=10, i=10, and the fourth page (JOB(16)–JOB(20)) is currently displayed. In this case, when jobs accumulated in the application server 103 are deleted to set A'=7, and then the scroll-down button is pressed, the job information of the second one of two pages required to display seven jobs is displayed. In step S608, it is checked whether the job information JOB(i) acquired in step S607 is null. If the acquired job information is null, the process returns to step S604; otherwise, the process advances to step S609. Since there is a difference between the acquisition timings in steps S604 and S607, this process is necessary.

In step S609, n pieces of job information, displayable on the screen, of the newly acquired job information are displayed as a list, and a page number is updated, thereby returning the process to step S600.

In step S610 to which the process branches from step S605 or S606, a maximum of next N pieces of job information JOB(i) to JOB(i+N−1) are acquired, where i is obtained by i=i+N. After acquiring the job information, the process advances to step S609. As an example which executes this step, the total number of jobs does not change, or the total number of jobs changes but there are pieces of information to be displayed in a next page.

In step S611 to which the process branches when the scroll-up button is pressed, it is determined whether the n pieces of job information for all the pages to be displayed on the operation unit 211 are saved in the RAM 212.

In step S612, if, as a result of the determination in step S611, the pieces of job information are saved, the process advances to step S609. If the pieces of job information are not saved in the RAM, the process advances to step S613.

In step S613, the CPU 201 requests, via the network, the application server 103 to transmit the current total number A' of jobs accumulated in the application server 103, and saves, in the RAM 212, the current total number A' of jobs returned in response to the request.

In step S614, the total number A of jobs previously acquired is compared with the latest number A' of jobs acquired in step S613. If there is no difference between the total numbers of jobs, the process advances to step S618; otherwise, the process advances to step S615.

In step S615, it is determined whether the print jobs, the number A' of which has been acquired in step S613, include the first job information JOB(i−N) of a maximum of N pieces of job information preceding to the currently acquired job information. That is, it is determined whether A'<i−N holds. If the inequality holds, N pieces of job information are not included, and thus the process branches to step S616; otherwise, N pieces of job information are included, and thus the process branches to step S618.

When the number A' of jobs acquired in step S613 decreases and there is no job information to be displayed next, the process advances to step S616. As job information to be displayed, a maximum of N pieces of job information (i) including a last page P=ROUNDUP(A'/n) are acquired from the application server 103, and saved in the RAM 212. Note that i is obtained by i=ROUNDDOWN((A'−1)/N)*N+1. As an example which executes this procedure, assume that A=30, n=5, N=10, i=10, and the fifth page (JOB information (21)–JOB information (26)) is currently displayed. In this case, jobs accumulated in the application server 103 may have been deleted. When A'=7 and the scroll-up button is pressed, the job information of the second page is displayed.

In step S617, it is checked whether the job information JOB(i) acquired in step S616 is null. If the acquired job information is null, the process returns to step S613; otherwise, the process advances to step S609. Since there is a difference between the acquisition timings in steps S613 and S616, this process is necessary.

In step S618 to which the process advances from step S614 or S615, a maximum of next N pieces of job information JOB(i) to JOB(i+N−1) are acquired, where i is obtained by i=i−N. After acquiring the job information, the process branches to step S609. As an example which executes this step, the total number A' of jobs does not change, or the total number A' of jobs changes but there are pieces of information to be displayed in a previous page.

<Example of Job List>

FIGS. 7A, 7B, 7C, 7D, and 7E are schematic views showing an example when scroll-down operations are performed. In the example of the schematic views, assume that the number N of jobs for which job information is acquired at once is 6, and the number n of jobs displayed at once is 3.

FIG. 7A is a schematic view showing the job information in steps S307 and S600. Assume that the total number A of jobs accumulated in the application server 103 is 10. Referring to FIG. 7A, the application server 103 has transmitted, to the image processing apparatus 101, pieces of job information JOB(1) to JOB(6), of which the pieces of job information JOB(1) to JOB(3) are displayed as a job list. In this state, when the user presses the scroll-down button, it is determined in step S603 that the pieces of job information JOB(4) to JOB(6) to be displayed in a next page have already been acquired, and thus the process advances to step S609. FIG. 7B shows this state. The displayed pieces of job information have been changed to the pieces of job information JOB(4) to JOB(6).

When the user presses the scroll-down button in the state shown in FIG. 7B, it is determined in step S603 that there is no job information to be displayed in a next page, and thus the process advances to step S604. In step S604, the CPU 201 acquires, from the application server 103, the total number A' of jobs currently accumulated in the application server 103. At this time, if the acquired total number A' of jobs is 13, it is determined in step S605 that the total number of jobs has changed, and thus the process advances to step S606. Since A'<i+N (13<1+6) does not hold in step S606, the process advances to step S610. In step S610, i=6 and pieces of job information JOB(7) to JOB(12) are acquired, thereby advancing the process to step S609. In step S609, the page number is updated, and the pieces of job information JOB(7) to JOB(9) are displayed. FIG. 7C is a schematic view showing this state.

When the user presses the scroll-down button in the state shown in FIG. 7C, a state shown in FIG. 7D is obtained. A procedure at this time is the same as that when the state shown in FIG. 7A transits to that shown in FIG. 7B. That is, the displayed job information has been changed to the pieces of job information JOB(10) to JOB(12).

When the user presses the scroll button in the state shown in FIG. 7D, it is determined in step S603 whether job information to be displayed in a next page has been acquired. Since the job information has not been acquired, the process advances to step S604. In step S604, the total number A' of jobs currently accumulated in the application server 103 is acquired. At this time, if accumulated jobs have been deleted and the total number A' of jobs is 5, it is determined in step S605 that the total number of jobs has changed, and thus the process advances to step S606. Since A'<i+N (5<7+6) holds in step S606, the process advances to step S607. The CPU 201 acquires a maximum of N pieces of job information JOB(i=1) (1=ROUNDDOWN((5−1)/6)*6+1) to JOB(5) including the last page in step S607, and displays the last page in step S609. FIG. 7E shows this state.

FIGS. 8A, 8B, 8C, and 8D are schematic views showing an example when the scroll-up button is pressed. In the example of the schematic views, assume that N=6 and n=3.

Figure 8A:
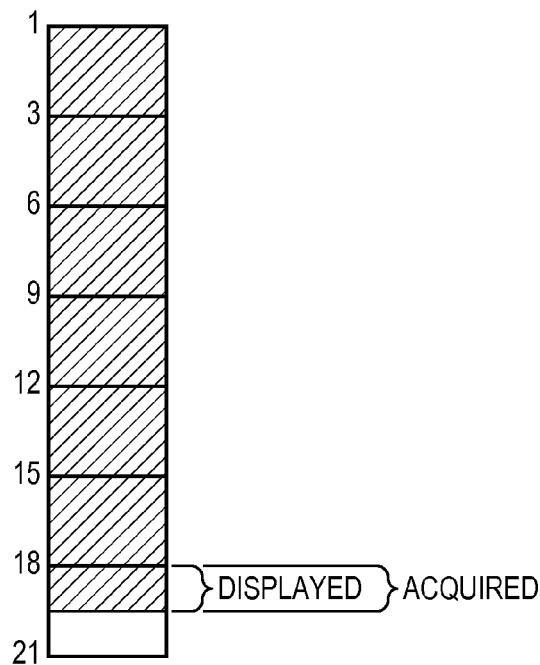
FIGS. 8A, 8B, 8C, and 8D are schematic views when scroll-up operations are performed.
Figure 8B:
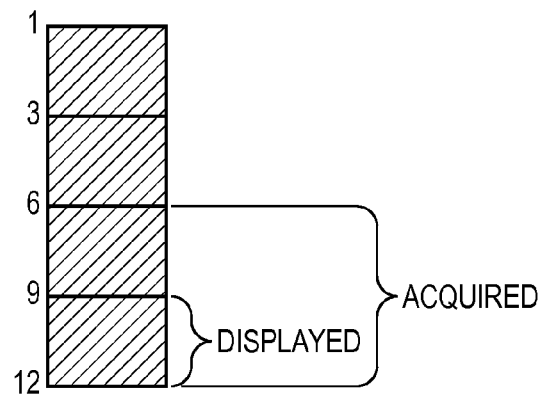

FIG. 8A shows a state in step S600. At this time, assume that the total number A of jobs accumulated in the application server 103 is 19 and i=19. When the user presses the scroll-up button in the state shown in FIG. 8A, it is determined in step S612 whether job information to be displayed in a previous page has been acquired. Since the job information has not been acquired, the process advances to step S613 to acquire the current total number A' of jobs. In this example, assume that jobs have been deleted and A'=12 is obtained. Since the total number of jobs has changed, the process advances from step S614 to step S615. Since A'<i−N (12<19−6) holds in step S615, the process advances to step S616 to acquire a maximum of N pieces of information JOB (i=7) (7=ROUNDDOWN((12−1)/6*6+1) including the last page, and the last page is displayed in step S609. FIG. 8B shows this state.

Figure 8C:
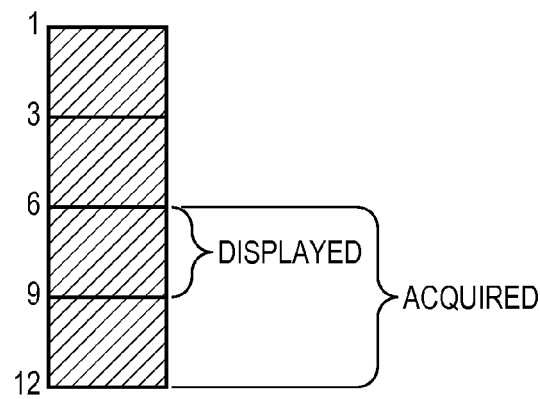

When the user presses the scroll-up button in the state shown in FIG. 8B, it is determined in step S612 that pieces of job information JOB(7) to JOB(9) to be displayed in a previous page have been acquired, and thus the process advances to step S609. FIG. 8C shows this state.

Figure 8D:
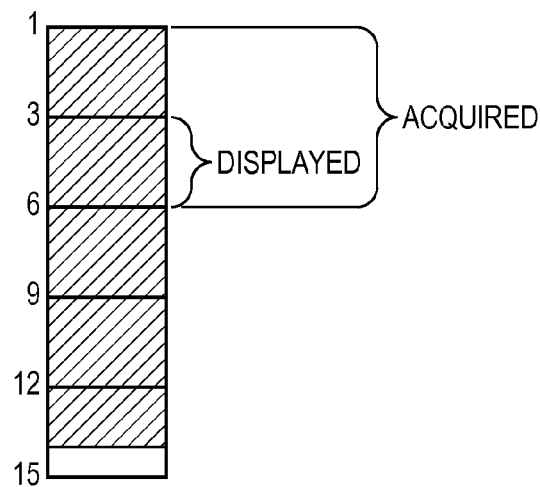

When the user presses the scroll-up button in the state shown in FIG. 8C, it is determined in step S612 that job information to be displayed in a previous page has not been acquired, and thus the process advances to step S613. At this time, if the total number A' of jobs accumulated in the application server 103 increases to 14, the process advances to step S615. Since A'<i−N (14<7−1) does not hold in this case, the process advances to step S618. In step S618, a maximum of next N pieces of job information are acquired. At this time, i=7−6, and pieces of job information JOB(1) to JOB(6) are acquired, thereby advancing the process to step S609. FIG. 8D shows this state.

Second Embodiment

In the first embodiment, the maximum number N of pieces of job information acquired from the application server 103 is a fixed value. The user, however, may manually set the value through an operation unit 211. In this case, the value set through the operation unit 211 is written in a RAM 212. Then, to access an application server 103, a CPU 201 loads the value, and sends a request based on the value.

Third Embodiment

In the first embodiment, the maximum number N of pieces of job information acquired from the application server 103 is a fixed value. A CPU, however, may dynamically change the value depending of the capacity of a RAM 212 or HDD 214. In this case, to access the application server 103, a CPU 201 changes the value of the number N based on the remaining capacity of the RAM 212 or HDD 214, and sends a request to an application server 103 based on the changed value.

Fourth Embodiment

A CPU may skip steps S605 and S614 of the first embodiment. In this case, a way of dealing with the last page of a job list is different depending on whether A=A'. N=n may be set, and job information which has been displayed as a job list but is no longer displayed by a scroll operation may be immediately deleted. With this processing, instead of displaying a job list based on acquired job information, job information is acquired from an application server 103 every time a job list is redisplayed by a scroll operation or the like. Therefore, every time a job list is redisplayed, the latest print jobs held in the application server 103 are reflected on the image processing apparatus 101.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-142309, filed Jun. 27, 2011 which is hereby incorporated by reference herein in its entirety.

What is claimed is:

1. An image forming system comprising:
a server and an image processing apparatus which receives a print job from the server and executes the print job, wherein
the image processing apparatus requests, from the server, job information of a first predetermined number of print jobs of print jobs which are executable by the image processing apparatus and are saved in the server;
the server transmits the job information in response to the job information request;
the image processing apparatus receives the job information from the server and saves the job information in a saving unit;
the image processing apparatus displays, as a job list for selecting a print job, a second predetermined number of pieces of job information of the job information saved in the saving unit;
the image processing apparatus requests, from the server, a print job selected from the job list;
the server transmits the print job in response to the request; and
the image processing apparatus receives the print job from the server, and executes the print job; and
the server determines based on capability information of the server whether or not the server supports a job selection function of displaying a list of jobs and allowing a user to select a job from the list,
wherein, if it is determined that the server supports the job selection function, in response to an instruction to display job information of print jobs, which are not displayed in the job list, of the print jobs executable by the image processing apparatus, if job information to be displayed is saved in the saving unit, the saved job information is displayed by the image processing apparatus, and if job information to be displayed is not saved in the saving unit, job information of the first predetermined number of next print jobs is requested from the server, the job information is saved in the saving unit, and the job information is displayed as a job list by the image processing apparatus, and
wherein if it is determined that the server does not support the job selection function, the server ignores the information other than display language of the capability information received from the image processing apparatus and generates setting information for making the job selection function ineffective, and the image processing apparatus displays a job selection screen in accordance with the setting information even if the image processing apparatus supports the job selection function.

2. The system according to claim 1, wherein when the instruction to display the job information of the print jobs which are not displayed is received, if the saving unit does not save job information to be displayed, prior to a request of job information by the request unit, the apparatus acquires, from the server, the number of print jobs which are held in the server and are executable by the apparatus, and determines based on the acquired number of print jobs whether the server saves the first predetermined number of print jobs to be requested to the server, and then if the server saves the print jobs, the apparatus requests, from the server, job information of the first predetermined number of next print jobs, and if the server does not save the print jobs, the apparatus requests, from the server, job information of the number of print jobs up to the first predetermined number from the last print job of the print jobs saved in the server.

3. The system according to claim 1, wherein the first predetermined number is not smaller than the second predetermined number.

4. The system according to claim 1, wherein the image forming apparatus comprises a unit which manually sets the first predetermined number.

5. The system according to claim 1, wherein the first predetermined number is dynamically changed depending on a remaining capacity of the saving unit.

6. an image output method executed by a server and an image processing apparatus connected with the server, comprising:
in the image processing apparatus, a request step of requesting, from the server, job information of a first predetermined number of print jobs of print jobs which are executable by the image processing apparatus and are saved in the server;

in the server, a step of transmitting the job information in response to the job information request;

in the image processing apparatus, a step of receiving the job information from the server and saving the job information in a saving unit;

in the image processing apparatus, a display step of displaying, as a job list for selecting a print job, a second predetermined number of pieces of job information of the job information saved in the saving unit;

in the image processing apparatus, a step of requesting, from the server, a print job selected from the job list, in the server, a step of transmitting the print job in response to the request; and in the image processing apparatus, a step of receiving the print job from the server, and executing the print job; and in the server, a step of determining based on capability information of the server whether or not the server supports a job selection function of displaying a list of jobs and allowing a user to select a job from the list, wherein, if it is determined that the server supports the job selection function, in response to an instruction to display job information of print jobs, which are not displayed in the job list, of the print jobs executable by the image processing apparatus, if job information to be displayed is saved in the saving unit, the saved job information is displayed in the display step, and if job information to be displayed is not saved in the saving unit, job information of the first predetermined number of next print jobs is requested from the server in the request step, the job information is saved in the saving unit, and the job information is displayed as a job list in the display step, and wherein if it is determined that the server does not support the job selection function, the server ignores the information other than display language of the capability information received from the image processing apparatus and generates setting information for making the job selection function ineffective, and the image processing apparatus displays a job selection screen in accordance with the setting information even if the image processing apparatus supports the job selection function.

7. The method according to claim 6, wherein when the instruction to display the job information of the print jobs which are not displayed is received, if job information to be displayed is not saved in the saving step, prior to a request of job information by the request unit, the number of print jobs which are held in the server and are executable by the apparatus are required from the server, and it is determined based on the acquired number of print jobs whether the server saves the first predetermined number of print jobs to be requested to the server, and then if the server saves the print jobs, job information of the first predetermined number of next print jobs is requested from the server in the request step, and if the server does not save the print jobs, job information of the number of print jobs up to the first predetermined number from the last print job of the print jobs saved in the server is requested from the server in the request step.

8. The method according to claim 6, wherein the first predetermined number is not smaller than the second predetermined number.

9. The method according to claim 6, further comprising a step of manually setting the first predetermined number.

10. The method according to claim 6, wherein the first predetermined number is dynamically changed depending on a remaining capacity of the saving unit.

* * * * *